United States Patent
Comstock

(10) Patent No.: US 11,632,700 B2
(45) Date of Patent: **\*Apr. 18, 2023**

(54) METHODS FOR A USER EQUIPMENT DEVICE TO REQUEST MAC MESSAGES FROM A BASE STATION

(71) Applicant: Kyocera Corporation, Kyoto (JP)

(72) Inventor: David Comstock, San Diego, CA (US)

(73) Assignee: Kyocera Corporation, Kyoto (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 17/398,738

(22) Filed: Aug. 10, 2021

(65) Prior Publication Data

US 2021/0368404 A1 Nov. 25, 2021

Related U.S. Application Data

(63) Continuation of application No. 16/339,102, filed as application No. PCT/US2017/055900 on Oct. 10, 2017, now Pat. No. 11,122,473.

(Continued)

(51) Int. Cl.
*H04W 36/00* (2009.01)
*H04W 36/08* (2009.01)
*H04W 36/36* (2009.01)

(52) U.S. Cl.
CPC ....... *H04W 36/0072* (2013.01); *H04W 36/08* (2013.01); *H04W 36/36* (2013.01)

(58) Field of Classification Search
CPC . H04W 80/04; H04W 36/18; H04W 36/0011; H04W 36/14; H04W 36/08; H04W 36/0072; H04W 36/36

(Continued)

(56) References Cited

U.S. PATENT DOCUMENTS 7,697,480 B2\* 4/2010 Marin ............... H04W 36/14
455/442
7,991,002 B2\* 8/2011 Lee ............... H04W 36/0066
370/467

(Continued)

FOREIGN PATENT DOCUMENTS

KR 1020150117897 A 10/2015
WO 2015156655 A1 10/2015

OTHER PUBLICATIONS

3GPP TSG-RAN WG2 Meeting #95bis, Koshsiung, Taiwan, Oct. 10-14, 2016, R2-167108, Agenda item: 8.6.2 (LTE-eMob-Core), Source: L.G. Electronics, Inc., Title: The way to obtain UL grant and TA information for RACH-less HO. (Year: 2016).\*

(Continued)

*Primary Examiner* — Mohammad S Anwar
*Assistant Examiner* — Sanjay K Dewan

(57) ABSTRACT

In order to perform a RACH-less handover from a source base station to a target base station, a UE device generates a request that the target base station is to send a Media Access Control (MAC) message to the UE device. The request can be sent with a Radio Resource Control (RRC) Connection Reconfiguration Complete message. Alternatively, an RRC message sent from a UE device functions as an implicit request that the target base station is to send a MAC message to the UE device. The request can also be configured to specify a particular MAC Control Element that the target base station should send. The target base station transmits the requested MAC message, along with TA information, if required. The UE device determines when the handover has been completed, based at least partially on when the requested MAC message is received from the target base station.

5 Claims, 4 Drawing Sheets

Related U.S. Application Data

(60) Provisional application No. 62/406,721, filed on Oct. 11, 2016, provisional application No. 62/407,243, filed on Oct. 12, 2016.

(58) Field of Classification Search
USPC .................................................... 370/331
See application file for complete search history.

(56) References Cited

U.S. PATENT DOCUMENTS

| | | | |
|---|---|---|---|
| 8,243,672 B2 | 8/2012 | Park et al. | |
| 8,805,362 B2 | 8/2014 | Amirijoo et al. | |
| 9,344,985 B2 | 5/2016 | Loehr et al. | |
| 2005/0078634 A1* | 4/2005 | Seo | H04W 76/22 370/331 |
| 2008/0130580 A1* | 6/2008 | Chaponniere | H04W 36/02 370/331 |
| 2009/0238141 A1 | 9/2009 | Damnjanovic et al. | |
| 2010/0002653 A1* | 1/2010 | Agiwal | H04W 36/0061 455/434 |
| 2010/0113051 A1 | 5/2010 | Du et al. | |
| 2010/0202409 A1* | 8/2010 | Marinier | H04W 36/06 370/331 |
| 2010/0278143 A1 | 11/2010 | Chun et al. | |
| 2012/0026978 A1* | 2/2012 | Jung | H04W 36/14 370/331 |
| 2012/0294285 A1* | 11/2012 | Jung | H04W 80/04 370/331 |
| 2013/0114516 A1 | 5/2013 | Koo et al. | |
| 2013/0188473 A1 | 7/2013 | Dinan | |
| 2013/0188619 A1 | 7/2013 | Dinan | |
| 2013/0301541 A1 | 11/2013 | Mukherjee et al. | |
| 2013/0343307 A1 | 12/2013 | Desai et al. | |
| 2014/0192771 A1 | 7/2014 | Jung et al. | |
| 2014/0226621 A1* | 8/2014 | Choi | H04W 36/0061 370/331 |
| 2014/0334371 A1 | 11/2014 | Kim et al. | |
| 2015/0141015 A1 | 5/2015 | Zhang et al. | |
| 2015/0181493 A1 | 6/2015 | Park et al. | |
| 2015/0223124 A1 | 8/2015 | Wang et al. | |
| 2015/0223196 A1 | 8/2015 | Kim et al. | |
| 2016/0100374 A1 | 4/2016 | Choi et al. | |
| 2016/0227503 A1 | 8/2016 | Dalsgaard et al. | |
| 2016/0338112 A1 | 11/2016 | Lee et al. | |
| 2016/0381611 A1* | 12/2016 | Uchino | H04W 36/0061 370/331 |
| 2017/0079081 A1 | 3/2017 | Kim et al. | |
| 2017/0135001 A1 | 5/2017 | Kim et al. | |
| 2018/0020382 A1 | 1/2018 | Kim et al. | |
| 2019/0150096 A1* | 5/2019 | Lee | H04W 52/40 370/331 |
| 2019/0261427 A1 | 8/2019 | Comstock | |

OTHER PUBLICATIONS

3GPP TS 36.300 v14.4.0 (Sep. 2017), 3rd Generation Parternership Project; Technical Specification Group Radio Access Network; Evolved Universal Terrestrial Radio Access (E-UTRA) and Evolved Universal Terrestrial Radio Access Network (E-UTRAN); Overall description; stage 2 (Release 14). (Year: 2017).*

3GPP TSG-RAN WG2 Meeting #95 bis, Kohsiung, Taiwan, Oct. 10-14, 2016, R2-166577, Agenda item: 8.6.1; Source: ETRI, Title: Remaining issues on Running stage 2 CR. (Year: 2016).*

3GPP TSG-RAN WG2 #95, Gothenburg, Sweden, Aug. 22-26, 2016, R2-165718, Agenda item: 8.6.1, Source: Kyocera, Title: Timing advance determination by target eNB for RACH-less handover. (Year: 2016).*

Etri; "Remaining Issues on Running Stage 2 CR," R2-166577; 3GPPTSG-RAN WG2 Meeting #95bis; Oct. 10-14, 2016; Kaohsiung, TW.

LG Electronics, Inc.;"The way to obtain UL grant and TA information for RACH-less HO," R2-167108; 3GPP TSG-RAN WG2 Meeting #95bis; Oct. 10-14, 2016; Kaohsiung, TW.

Kyocera; "Timing advance determination by target eNB for RACH-less handover," R2-165718; 3GPP TSG-RAN WG2 Meeting #95; Aug. 22-26, 2016; Gothenburg, SE.

3GPP; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0; Sep. 25, 2017; Valbonne, FR.

* cited by examiner

METHODS FOR A USER EQUIPMENT DEVICE TO REQUEST MAC MESSAGES FROM A BASE STATION

RELATED APPLICATIONS

The present application is a continuation of and claims priority to U.S. application Ser. No. 16/339,102, entitled "METHODS FOR A USER EQUIPMENT DEVICE TO REQUEST MAC MESSAGES FROM A BASE STATION" and filed on Apr. 3, 2019; which is a national stage application of PCT/US2017/055900. entitled "METHODS FOR A USER EQUIPMENT DEVICE TO REQUEST MAC MESSAGES FROM A BASE STATION" and filed on Oct. 10, 2017; which claims priority to Provisional Application No. 62/406,721, entitled "METHOD OF UE REQUESTS FOR MAC MESSAGES FROM AN ENB", filed Oct. 11, 2016, and to Provisional Application No. 62/407,243, entitled "METHODS FOR A UE TO REQUEST MAC MESSAGES FROM AN ENB", filed Oct. 12, 2016, all of which are assigned to the assignee hereof and hereby expressly incorporated by reference in their entirety.

FIELD

This invention generally relates to wireless communications and more particularly to user equipment devices requesting messages from base stations.

BACKGROUND

In conventional systems, a handover of a user equipment (UE) device from a source base station (e.g., source eNB) to a target base station (e.g., target eNB) involves the source base station transmitting a Handover Request message to the target base station (e.g., to initiate a handover) and the target base station transmitting a message in response. The source base station signals target base station uplink resources to the UE device, which utilizes the uplink resources for a Random-Access Channel (RACH) procedure. After the UE device is handed over to the target base station, the UE device transmits an uplink signal to the target base station as part of the RACH procedure. The target base station uses the uplink signal received from the UE device to calculate a Timing Advance (TA), which is needed in order for the UE device's uplink transmissions to be synchronized to the target base station after handover. The target base station signals the TA in the Random Access Response (RAR) message, along with uplink resources needed for the UE device to obtain uplink access to the target base station as part of the RACH procedure. The UE device determines when the handover procedure is completed for the UE device, based upon when the UE device receives the RAR message.

SUMMARY

In order to perform a handover from a source base station to a target base station, where the handover procedure does not include the RACH procedure (RACH-less handover), a UE device generates a request that the target base station is to send a Media Access Control (MAC) message to the UE device. In some examples, the request can be sent along with a Radio Resource Control (RRC) Connection Reconfiguration Complete message. In other examples, an RRC message, such as an RRC Connection Reconfiguration Complete message sent from a UE device to the target base station, functions as an implicit request that the target base station is to send a MAC message to the UE device. The request can also be configured to specify a particular MAC Control Element that the target base station should send in response to receiving the request. Upon receipt of the request, the target base station transmits the requested MAC message to the UE device, along with TA information, if required. The UE device determines when the handover has been completed, based at least partially on when the requested MAC message is received from the target base station.

DETAILED DESCRIPTION

Figure 1:
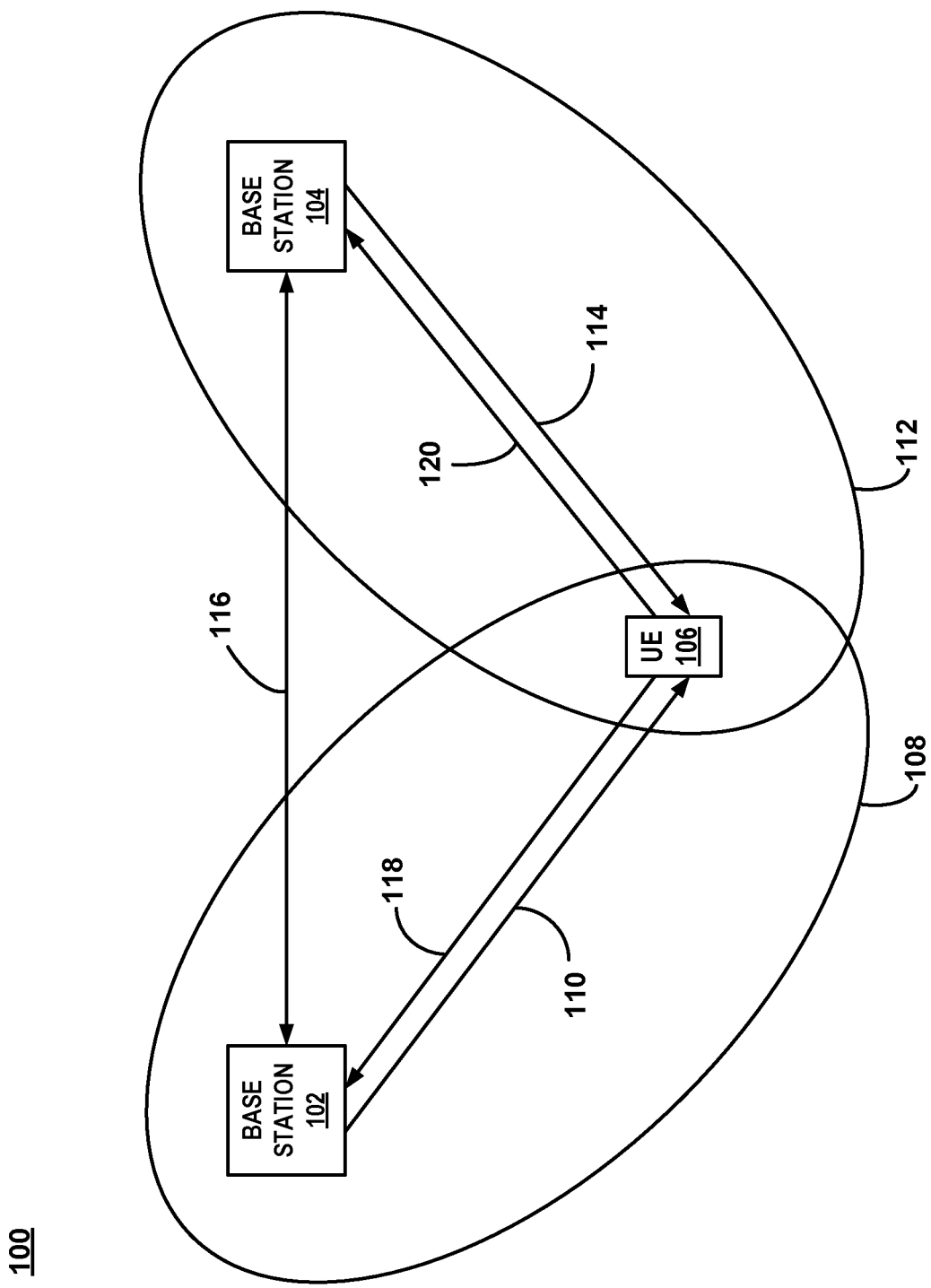
FIG. 1 is a block diagram of a communication system for an example in which a UE device requests that a base station transmits a MAC message to the UE device.

The Timing Advance (TA) provided by a target base station to a UE device during a handover in conventional systems is needed in order for the UE device's uplink transmissions to be synchronized to the target base station after handover. If the uplink transmissions are not properly synchronized to the target base station, the target base station will not be able to detect and decode the transmissions. However, one drawback of conventional systems is that the TA determination step is performed after the handover procedure has been initiated, which unnecessarily increases the amount of time required to complete the handover procedure in examples when the TA does not need to be determined during a handover.

RACH-less handovers can be used in examples when the TA does not need to be determined during a handover, in order to reduce the time required to complete the handover procedure. As used herein, the term "RACH-less handover" refers to skipping the transmission of the Random-Access Channel (RACH) by the user equipment (UE) device to the target base station (e.g., target eNB) during handover, which significantly improves the delay for the handover procedure since the RACH procedure is a substantial part of the handover delay. However, if the RACH procedure is not performed, an alternative method is needed to determine the TA for the UE device so that the target base station is able to detect and decode uplink transmissions from the UE device. Thus, an alternative method is needed to provide information, such as the TA and the uplink grant, which are usually included in the Random Access Response (RAR) message sent by the target base station in response to receiving the RACH message from the UE device. In addition, the alternative method must provide a way for the UE device to be able to determine when a handover of the UE device has been successfully completed, which is determined by receiving the RAR message in conventional systems.

The examples described herein involve transmitting an uplink grant for an uplink transmission to the target base station in a Radio Resource Control (RRC) Connection Reconfiguration message that is sent by the source base station to the UE device. Upon receipt of the RRC Connection Reconfiguration message, the UE device generates a request that the target base station is to send a MAC message to the UE device. The UE device transmits the request using the uplink grant received in the RRC Connection Reconfiguration message.

In some examples, the request can be sent along with an RRC Connection Reconfiguration Complete message, and in other examples, the RRC Connection Reconfiguration Complete message, itself, serves as an implicit request. Upon receipt of the request, the target base station transmits the requested MAC message to the UE device, along with TA information, if required. The UE device determines when the handover has been completed, based at least partially on when the requested MAC message is received from the target base station. Any unnecessary information received in the MAC message may be discarded by the UE device.

FIG. 1 is a block diagram of a communication system for an example in which a UE device requests that a base station transmits a MAC message to the UE device. The communication system 100 is part of a radio access network (not shown) that provides various wireless services to UE devices that are located within the respective service areas of the various base stations that are part of the radio access network.

In the interest of clarity and brevity, communication system 100 is shown as having only source base station 102 and target base station 104. However, in other examples, communication system 100 could have any suitable number of base stations. In the example of FIG. 1, at least a portion of the service area (cell) for source base station 102 is represented by cell 108, and at least a portion of the service area (cell) for target base station 104 is represented by cell 112. Cells 108, 112 are represented by ovals, but a typical communication system 100 would have a plurality of cells, each having variously shaped geographical service areas. Base stations 102, 104, sometimes referred to as eNodeBs or eNBs, communicate with the wireless user equipment (UE) device 106 by respectively transmitting downlink signals 110, 114 to UE device 106. Base stations 102, 104 receive uplink signals 118, 120 transmitted from the UE device 106. The UE device 106 is any wireless communication device such as a mobile phone, a transceiver modem, a personal digital assistant (PDA), a tablet, or a smartphone, for example.

Figure 2A:
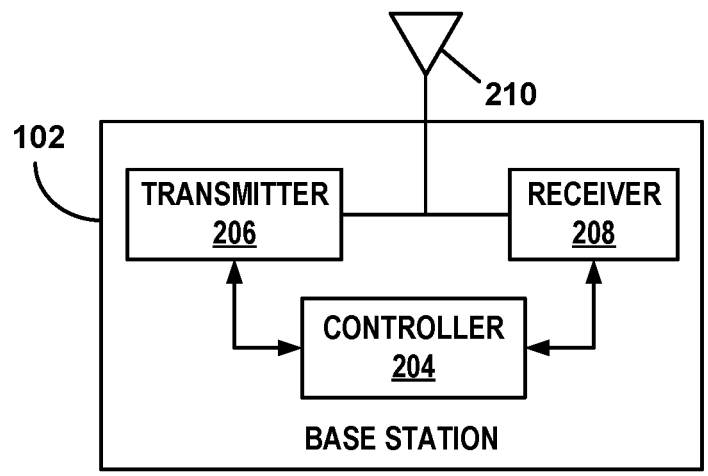
FIG. 2A is a block diagram of an example of the base stations shown in FIG. 1.

Base stations 102, 104 are connected to the network through a backhaul (not shown) in accordance with known techniques. As shown in FIG. 2A, source base station 102 comprises controller 204, transmitter 206, and receiver 208, as well as other electronics, hardware, and code. Although FIG. 2A specifically depicts the circuitry and configuration of source base station 102, the same base station circuitry and configuration is utilized for target base station 104 in communication system 100. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 110 and can apply any one of a plurality of modulation orders. The demodulator demodulates any uplink signals 118 received at the base station 102 in accordance with one of a plurality of modulation orders.

Figure 2B:
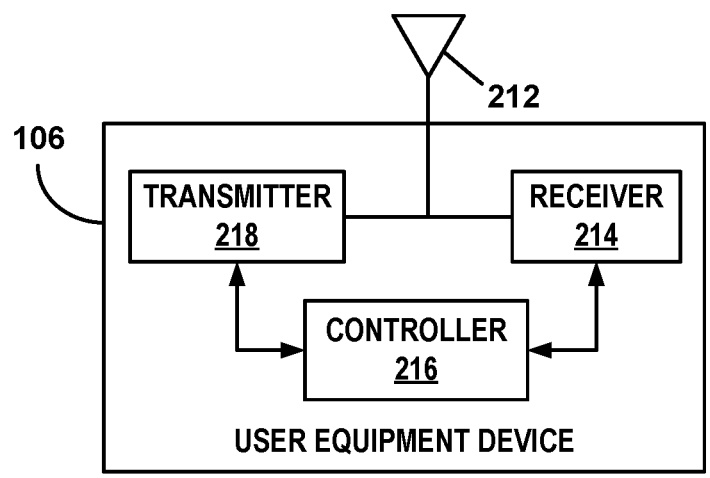
FIG. 2B is a block diagram of an example of the UE device shown in FIG. 1.

Returning to FIG. 1, the communication system 100 provides various wireless services to UE device 106 via base stations 102, 104. For the examples herein, the communication system 100 operates in accordance with at least one revision of the 3rd Generation Partnership Project Long Term Evolution (3GPP LTE) communication specification. UE device 106 is initially served by source base station 102 and, thus, receives downlink signals 110 via antenna 212 and receiver 214, as shown in FIG. 2B. Besides antenna 212 and receiver 214, UE device 106 further comprises controller 216 and transmitter 218, as well as other electronics, hardware, and code. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 118, which are shown in FIG. 1. The demodulator demodulates the downlink signals 110, 114 in accordance with one of a plurality of modulation orders.

At the beginning of operation of the example shown in FIG. 1, the UE device 106 is being served by source base station 102. Thus, upon receipt of the downlink signals 110, the UE device 106 demodulates the downlink signals 110, which yields encoded data packets that contain data pertaining to at least one of the wireless services that the source base station 102 is providing to the UE device 106. The UE device 106 decodes the encoded data packets, using controller 216, to obtain the data.

When any one or more criteria are met for source base station 102 to hand the UE device 106 over to target base station 104, source base station 102 transmits a handover request, via communication link 116, to target base station 104. The handover criteria may include, for example, radio congestion at source base station 102, poor/deteriorating signal quality for the uplink/downlink signals for UE device 106, and/or underutilization of available resources by target base station 104. However, any other suitable criteria could be used.

Figure 3A:
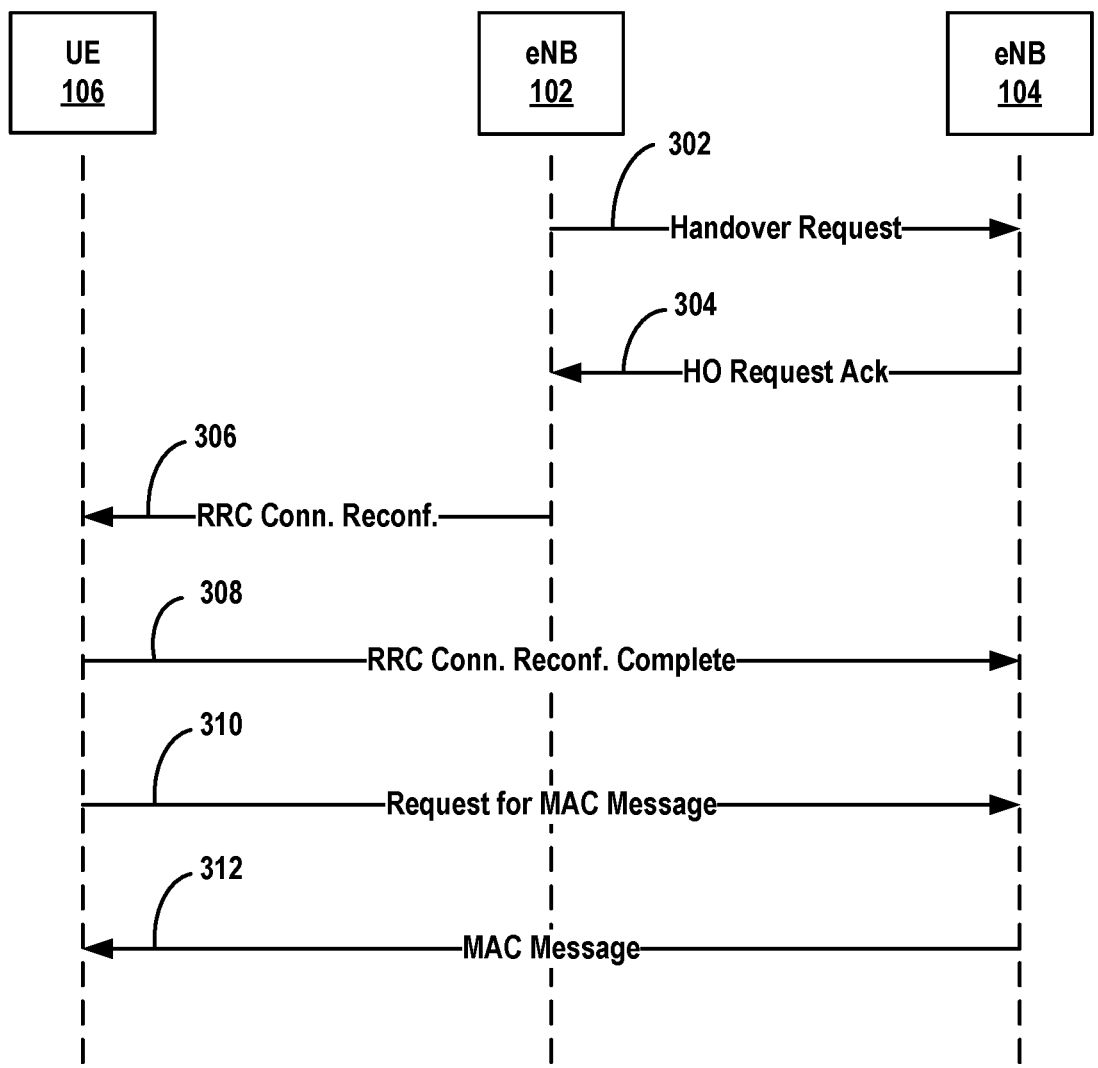
FIG. 3A is a messaging diagram of an example of the messages exchanged between the various system components shown in FIG. 1.

Regardless of the criteria used, the source base station 102 can transmit the handover request to target base station 104 via a wired (e.g., X2) or a wireless communication link. If the transmission is wireless, source base station 102 uses transmitter 206 and antenna 210 to transmit the UE device radio transmission configuration information, and target base station 104 receives the wireless transmission of the handover request via antenna 210 and receiver 208. The transmission of the handover request to the target base station 104 is represented in FIG. 3A by signal 302.

If the target base station 104 agrees to the handover, the target base station 104 sends a handover request acknowledgement message to the source base station 102 via communication link 116, which can be a wired connection or a wireless connection. The handover request acknowledgement message includes configuration information to be sent to the UE device 106 to be used for accessing the target base station 104. The transmission of the handover request acknowledgement is represented in FIG. 3A by signal 304. Upon receipt of the handover request acknowledgement, the source base station 102 transmits a Radio Resource Control (RRC) Connection Reconfiguration message to the UE device 106. The RRC Connection Reconfiguration message includes uplink grant information, which the UE device 106 will utilize to send an RRC Connection Reconfiguration Complete message to the target base station 104 once the RRC Connection Reconfiguration is complete. The transmission of the RRC Connection Reconfiguration message is represented in FIG. 3A by signal 306.

Figure 3B:
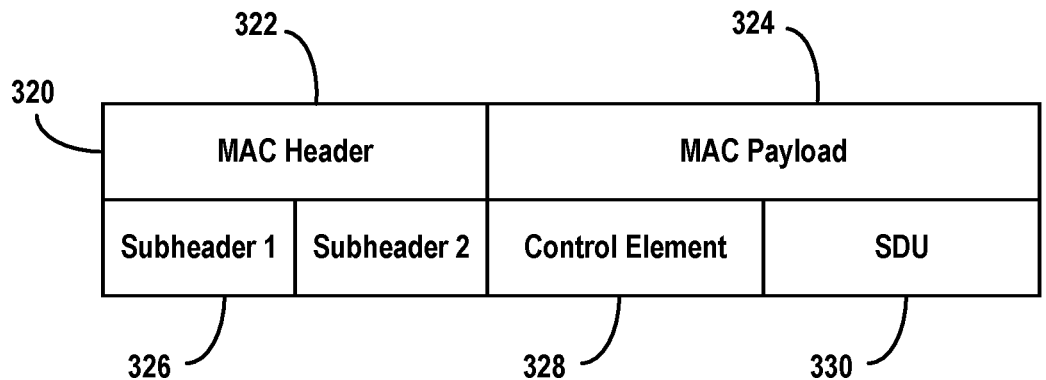
FIG. 3B is block diagram of an example of a MAC Protocol Data Unit structure.

Upon receipt of the RRC Connection Reconfiguration message, the UE device 106 generates a request that the target base station 104 transmits a Media Access Control (MAC) message to the UE device 106. In some examples, the request comprises a Logical Channel Identifier (LCID) located in a subheader of a MAC Protocol Data Unit (PDU) that will be transmitted to the target base station 104. FIG. 3B shows an example of a MAC PDU structure 320, which comprises a MAC header 322 and a MAC payload 324. The MAC header 322 comprises one or more subheaders 326 that identify the type of information contained in the MAC payload 324. There is a subheader 326 associated with each entry in the MAC payload 324. As can be seen in FIG. 3B, the first part of the MAC payload 324 contains one or more MAC Control Elements 328 that are followed by one or more MAC Service Data Units (SDUs) 330. The MAC SDUs include control data, such as an RRC message, and user data. For the example shown in FIG. 3B, subheader 1 is associated with MAC Control Element 328, and subheader 2 is associated with MAC SDU 330.

In some examples, the LCID, itself, is defined to request that the target base station 104 transmits a specific MAC Control Element, such as a UE Contention Resolution Identity MAC Control Element, to the UE device 106. For these examples, only the LCID located in a subheader (e.g., subheader 1) is used to request a specific MAC Control Element or other MAC message, and no payload information is needed for the request. However, the request may be transmitted in a same MAC PDU 320 that contains a subheader (e.g., subheader 2) and a corresponding MAC SDU 330 that includes an RRC Connection Reconfiguration Complete message. In other examples, an RRC message, such as the RRC Connection Reconfiguration Complete message is used to implicitly request that the target base station 104 is to transmit a specific MAC message. In still other examples, regardless of the nature of the request, the request is that the target base station 104 is to transmit a Random Access Response (RAR) message to the UE device 106.

Alternatively, the LCID can be a generic MAC Command Request, indicating that a MAC Control Element located in the MAC payload 324 identifies the requested command. For example, the LCID, which is included in a subheader 326 of the MAC PDU 320, is set to the MAC Command Request value, and the specific MAC Control Element or MAC message being requested (e.g., UE Contention Resolution Identity or RAR) is identified by a value located in a MAC SDU 330 that corresponds with the subheader that contains the MAC Command Request LCID. The request may also be transmitted in a same MAC PDU 320 that contains a subheader 326 and a corresponding MAC SDU 330 that includes an RRC Connection Reconfiguration Complete message.

For the examples described herein, MAC messages contain control information that originates and terminates in peer MAC layer (Layer 2) protocol entities, such as specified in the 3rd Generation Partnership Project Long Term Evolution (3GPP LTE) MAC specification, for example, and includes MAC messages, such as the Random Access Response (RAR) message, as well as MAC Control Elements. Radio Resource Control (RRC) messages contain control information that originates and terminates in peer RRC layer (Layer 3) protocol entities. RRC layer messages are higher layer messages with respect to MAC layer messages.

As described above, in some examples, the request is included in an RRC message, such as a Radio Resource Control (RRC) Connection Reconfiguration Complete message. In some examples, an implicit request for the target base station 104 to send a MAC message is based on the target base station 104 receiving an RRC message and the nature of the current procedure, such as an ongoing RACH-less handover. For example, in response to the UE device 106 sending an RRC Connection Reconfiguration Complete message without including a RAR request message in the MAC layer, the target base station 104 sends a RAR message to the UE device 106 based on receiving an RRC Connection Reconfiguration Complete message specifically during a RACH-less handover procedure, in accordance with specified behavior, such as that defined in an industry standard specification. In other examples, when the UE device 106 sends a specific RRC message to the target base station 104, the target base station 104 sends a specific MAC message, based on receiving the RRC message and the nature of the specific procedure (e.g., during a RACH-less handover procedure).

Regardless of the format of the request that the target base station 104 is to transmit a MAC message, the UE device 106 transmits, via transmitter 218 and antenna 212, the request to the target base station 104 in an uplink transmission 120. As described above, in some examples, the request and the RRC Connection Reconfiguration Complete message may be transmitted at the same time or at different times in separate messages. In these examples, the transmission of the RRC Connection Reconfiguration Complete message is represented in FIG. 3A by signal 308, and the transmission of the request to the target base station 104 is represented in FIG. 3A by signal 310. However, in other examples, the transmission 310 of the request also includes the RRC Connection Reconfiguration Complete message, and in other examples, the RRC Connection Reconfiguration Complete message, itself, functions as an implicit request.

The target base station 104 receives the request via antenna 210 and receiver 208. Upon receipt of the request, the target base station 104 utilizes controller 204 to generate a MAC message in accordance with the received request. More specifically, in some examples, the target base station 104 generates a MAC message that contains the specific MAC Control Element indicated in the request from the UE device 106. For example, if the request was for a UE Contention Resolution Identity MAC Control Element, then the target base station 104 would generate a MAC message containing a UE Contention Resolution Identity MAC Control Element. Likewise, if the request was an explicit or an implicit request for a RAR, then the target base station 104 would generate a MAC message containing a RAR.

The target base station 104 transmits, via transmitter 206 and antenna 210, the MAC message containing the requested MAC message (e.g., a UE Contention Resolution Identity MAC Control Element or a RAR) to the UE device 106. The transmission of the MAC message is represented in FIG. 3A by signal 312. The UE device 106 receives the MAC message via antenna 212 and receiver 214. Based at least partially upon when the UE device 106 receives the requested MAC message, the UE device 106 uses controller 204 to determine when the handover procedure (e.g., from source base station 102 to target base station 104) is completed for the UE device 106.

FIG. 3A is a messaging diagram of an example of the messages exchanged between the various system components shown in FIG. 1. In this example, the source base station 102 transmits a handover request to target base station 104, via signal 302. In response, target base station 104 transmits a handover request acknowledgement to the source base station 102 via signal 304. Upon receipt of the handover request acknowledgement, the source base station transmits an RRC Connection Reconfiguration message to the UE device 106, which is represented by signal 306. As mentioned above, the RRC Connection Reconfiguration message may contain uplink grant information required by the UE device 106 as part of the handover to target base station 104.

Upon receipt of the RRC Connection Reconfiguration message, the UE device 106 generates a request that the target base station 104 is to transmit a MAC message to the UE device 106, as discussed above. The UE device 106 transmits the request to the target base station 104 in an uplink transmission 120. As described above, in some examples, the request and the RRC Connection Reconfiguration Complete message may be transmitted as separate messages. In these examples, the transmission of the RRC Connection Reconfiguration Complete message is represented by signal 308, and the transmission of the request to the target base station 104 is represented by signal 310. However, in other examples, the transmission 310 of the request also includes the RRC Connection Reconfiguration Complete message.

Upon receipt of the request, the target base station 104 generates the specific MAC message indicated in the request from the UE device 106. The target base station 104 transmits the requested MAC message (e.g., a UE Contention Resolution Identity MAC Control Element or a RAR) to the UE device 106. In some examples, the MAC message also contains the TA information needed for the UE device 106 to synchronize its uplink transmissions to the target base station after handover. The transmission of the MAC message is represented by signal 312.

Figure 4:
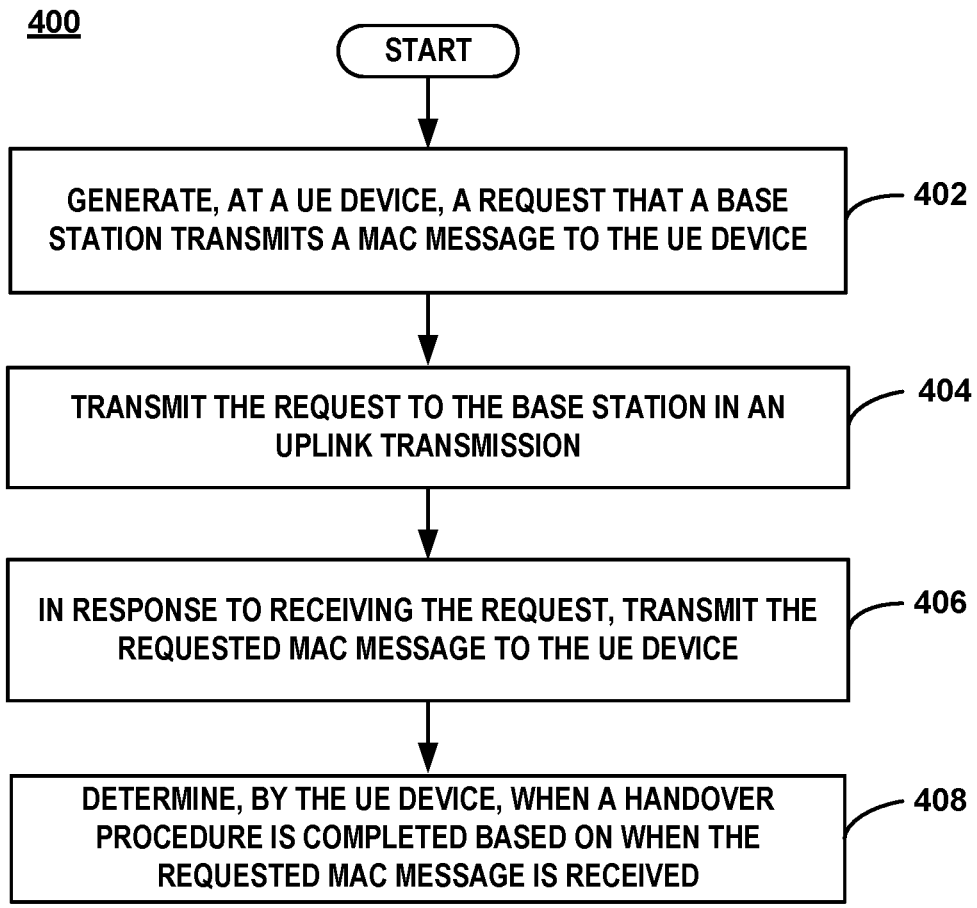
FIG. 4 is a flowchart of an example of a method in which a UE device requests that a base station transmits a MAC message to the UE device.

FIG. 4 is a flowchart of an example of a method in which a UE device requests that a base station transmits a MAC message to the UE device. The method 400 begins at step 402 with generating, at UE device 106, a request that target base station 104 is to transmit, to the UE device 106, a specific MAC message. At step 404, the UE device 106 transmits the request to the target base station 104 in an uplink transmission. At step 406, in response to receiving the request, the target base station 104 generates the requested MAC message and transmits the requested MAC message to the UE device 106. At step 408, the UE device 106 determines when the handover procedure (e.g., from source base station 102 to target base station 104) is completed for the UE device 106, based at least partially upon when the UE device 106 receives the requested MAC message.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A user equipment (UE) device comprising:
a processor and a memory electrically coupled to the processor, the processor configured to:
in a Random-Access Channel (RACH)-less handover procedure of the user equipment (UE) device from a source base station to a target base station, transmit control information to the target base station, the RACH-less handover procedure where the UE skips transmitting a RACH to the target base station; and
in response to transmitting the control information, receive a UE Contention Resolution Identity Media Access Control (MAC) Control Element sent from the target base station.

2. The UE device of claim 1, wherein in response to receiving the UE Contention Resolution Identity MAC Control Element, the RACH-less handover procedure is completed.

3. The UE device of claim 1, wherein the control information comprises a Radio Resource Control (RRC) Connection Reconfiguration Complete message.

4. An apparatus for a user equipment (UE) device, the apparatus comprising processor and a memory electrically coupled to the processor, the processor configured to:
in a Random-Access Channel (RACH)-less handover procedure of the user equipment (UE) device from a source base station to a target base station, transmit control information to the target base station, the RACH-less handover procedure where the UE skips transmitting a RACH to the target base station; and
in response to transmitting the control information, receive a UE Contention Resolution Identity Media Access Control (MAC) Control Element sent from the target base station.

5. A target base station comprising:
a processor and a memory electrically coupled to the processor, the processor configured to:
in a Random-Access Channel (RACH)-less handover procedure of a user equipment (UE) device from a source base station to the target base station, receive control information sent from the UE device, the RACH-less handover procedure where the UE skips transmitting a RACH to the target base station; and
in response to receiving the control information, transmit a UE Contention Resolution Identity MAC Control Element to the UE device.

* * * * *